United States Patent
Dettinger et al.

(10) Patent No.: US 10,107,238 B2
(45) Date of Patent: Oct. 23, 2018

(54) INTAKE MODULE OF A FRESH AIR SYSTEM

(71) Applicant: Mahle International GmbH, Stuttgart (DE)

(72) Inventors: Marco Dettinger, Pforzheim (DE); Mathias Endress, Stuttgart (DE); Wolfgang Gueth, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/557,799

(22) PCT Filed: Mar. 7, 2016

(86) PCT No.: PCT/EP2016/054782
§ 371 (c)(1),
(2) Date: Sep. 12, 2017

(87) PCT Pub. No.: WO2016/146417
PCT Pub. Date: Sep. 22, 2016

(65) Prior Publication Data
US 2018/0066616 A1    Mar. 8, 2018

(30) Foreign Application Priority Data
Mar. 13, 2015 (DE) .................. 10 2015 204 605

(51) Int. Cl.
*F02M 35/10* (2006.01)
*F02D 9/10* (2006.01)
(Continued)

(52) U.S. Cl.
CPC ... *F02M 35/10006* (2013.01); *F02B 27/0273* (2013.01); *F02D 9/1095* (2013.01);
(Continued)

(58) Field of Classification Search
CPC ....... F02M 35/10144; F02M 35/10347; F02M 35/10039; F02B 27/02; F02B 27/0252; F02B 31/06
(Continued)

(56) References Cited

U.S. PATENT DOCUMENTS 4,907,547 A    3/1990  Daly
5,813,380 A    9/1998  Takahashi et al.
(Continued)

FOREIGN PATENT DOCUMENTS

DE    69012150 T2    2/1995
DE    4499626 T1    2/1996
(Continued)

OTHER PUBLICATIONS

English abstract for JP-2003-322165.
(Continued)

*Primary Examiner* — Marguerite McMahon
*Assistant Examiner* — James Kim
(74) *Attorney, Agent, or Firm* — Fishman Stewart PLLC

(57) ABSTRACT

An intake module of a fresh air system for an internal combustion engine may include a housing having openings through which fresh air is flowable, and a control device for controlling a cross-section of the openings. The control device may include at least one control staff rotationally mounted about an axis rotation on the housing by at least one bearing bracket, and at least one control valve rotationally fixed on the control shaft for at least one of the openings. The housing may have at least one bearing receiving portion having an insertion opening through which the bearing bracket may be inserted in an insertion direction oriented perpendicularly to the axis of rotation. The bearing bracket may have a first bearing part having a first bearing section on which the control shaft rests with a circumferential
(Continued)

section, and a second bearing part having a second bearing section opposite the first bearing section on which the control shaft rests with a second circumferential section opposite the first circumferential section. The bearing parts may each have an inner surface facing one another in a transverse direction perpendicular to the axis of rotation and insertion direction, and at least one flat positioning surface extending perpendicularly to the transverse direction and raised from the inner surface. The positioning surfaces of the first and second bearing parts may rest flat against each other, and a gap may be formed in the transverse direction between the inner surfaces outside the positioning surfaces.

24 Claims, 4 Drawing Sheets

(51) Int. Cl.
  *F02B 27/02* (2006.01)
  *F02B 31/06* (2006.01)
(52) U.S. Cl.
  CPC ....... *F02M 35/10354* (2013.01); *F02B 31/06* (2013.01); *F02D 9/107* (2013.01); *F02M 35/10314* (2013.01)
(58) Field of Classification Search
  USPC ......... 123/184.59, 337, 336, 184.42, 184.53, 123/184.57
  See application file for complete search history.

(56) References Cited

U.S. PATENT DOCUMENTS

| | | | | |
|---|---|---|---|---|
| 6,662,772 B1* | 12/2003 | Murphy | ................. | F02B 31/06 123/184.21 |
| 6,997,157 B2* | 2/2006 | Ikuma | ................. | F02B 27/0263 123/184.21 |
| 7,162,997 B2* | 1/2007 | Madeira | ................. | F02B 31/085 123/336 |
| 8,555,847 B2* | 10/2013 | Menin | ................. | F02B 31/06 123/184.21 |
| 2013/0087121 A1* | 4/2013 | Hiei | ................. | B62K 23/04 123/337 |
| 2013/0160736 A1* | 6/2013 | Matsuzaki | ............ | F02D 9/1075 123/337 |
| 2015/0090219 A1* | 4/2015 | Eisele | ................. | F02B 31/06 123/337 |

FOREIGN PATENT DOCUMENTS

| | | |
|---|---|---|
| DE | 202006019638 U1 | 4/2008 |
| DE | 102011087234 A1 | 5/2013 |
| EP | 2322779 A1 | 5/2011 |
| FR | 2905159 A1 | 2/2008 |
| JP | H07-158457 A | 6/1995 |
| JP | 2003-322165 A | 11/2003 |
| JP | 2004-285893 A | 10/2004 |
| JP | 2004-291133 A | 10/2004 |
| JP | 2005-307465 A | 11/2005 |
| JP | 2006-161885 A | 6/2006 |
| JP | 2013-079596 A | 5/2013 |

OTHER PUBLICATIONS

English abstract for DE-102011087234.
English abstract for FR-2905159.
Japanese Office Action dated Jan. 9, 2018 related to corresponding Japanese Patent Application No. 2017-542091.
English abstract for JP-2006-161885.
English abstract for JPH07158457.
English abstract for JP-2013-079596.
English abstract for JP-2004-285893.
English abstract for JP-2005-307465.
English abstract for JP-2004-291133.

* cited by examiner

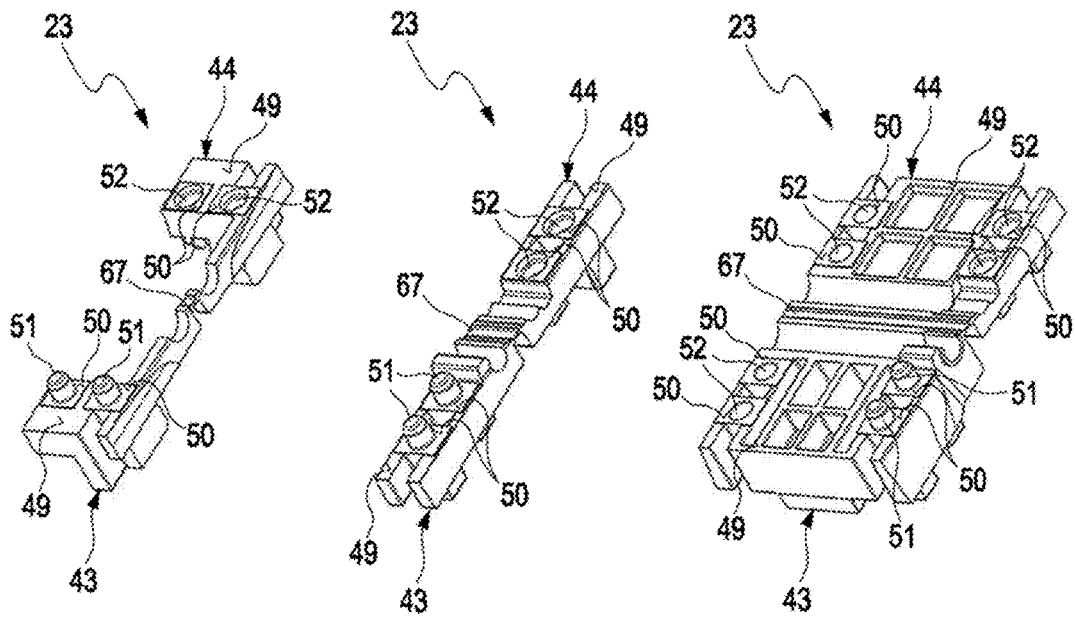
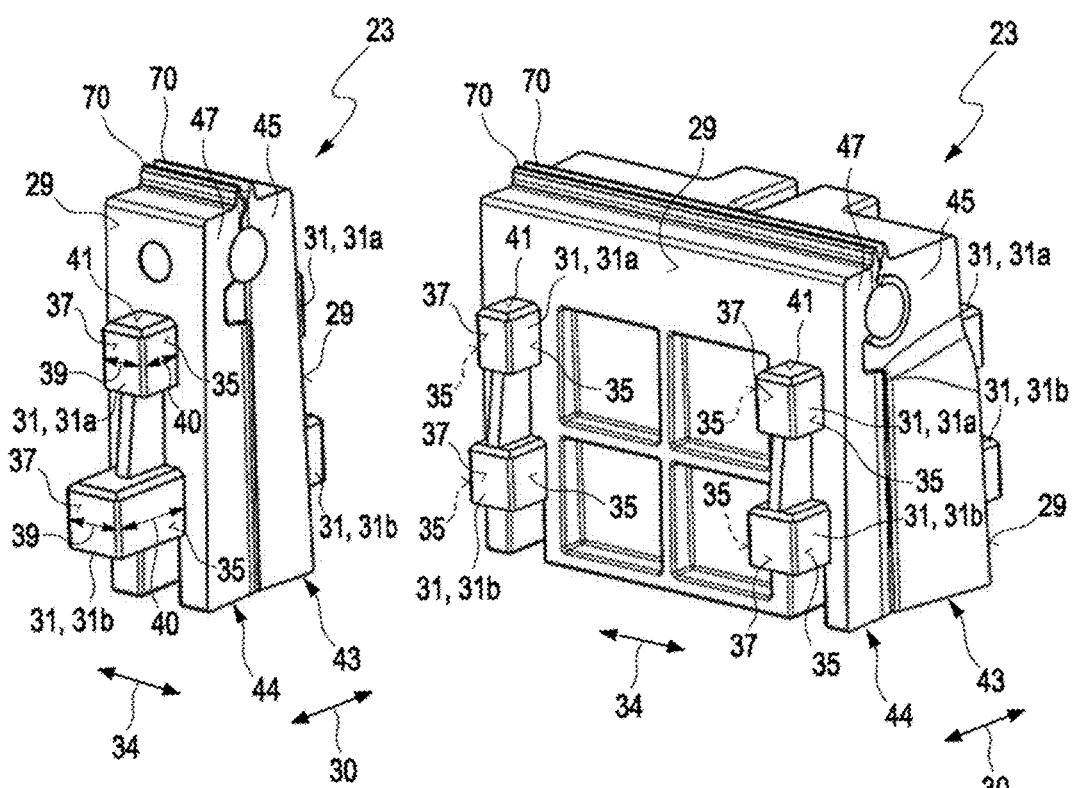

INTAKE MODULE OF A FRESH AIR SYSTEM

CROSS-REFERENCE TO RELATED APPLICATIONS

This application claims priority to International Patent Application No. PCT/EP2016/054782, filed on Mar. 7, 2016, and German Patent Application No. DE 10 2015 204 605.2, filed on Mar. 13, 2015, the contents of both of which are incorporated herein by reference in their entireties.

TECHNICAL FIELD

The present invention relates to an intake module of a fresh air system for an internal combustion engine, in particular in a motor vehicle.

BACKGROUND

Such an intake module usually has a housing which is fitted with an inlet opening for fresh air and with a flange section for fastening or connecting the housing to the internal combustion engine. A plurality of outlet openings for fresh air are provided in the flange section. A distributor chamber is usually formed in the housing, from which the fresh air supplied via the inlet opening is distributed to the outlet openings during operation of the internal combustion engine. In this case, at least one such outlet opening is provided per combustion chamber of the internal combustion engine. Such an intake module can be used both with a charged internal combustion engine and also with a non-charged internal combustion engine.

It is also usual to fit such intake modules with a control device for controlling a cross-section of at least one of the outlet openings through which flow can take place. Usually at least one such controllable outlet opening is assigned to each combustion chamber. It can further be provided that two outlet openings are assigned to each combustion chamber of the internal combustion engine, of which respectively one is controlled, i.e. can be varied in relation to its cross-section through which flow can take place whilst respectively the other is non-controlled, i.e. is permanently completely open. With the aid of such a control device, the fresh air supply can be optimized depending on the current operating state of the internal combustion engine. Such a control device can be provided with a control shaft which has at least one control valve arranged in a rotationally fixed manner on the control shaft for the respective outlet opening. With the aid of the respective control valve, the respective outlet opening can thus be controlled with respect to the cross-section through which flow can take place. In particular, the respective outlet opening can be opened or closed with the aid of the appurtenant control valve. Arbitrary intermediate positions are fundamentally also feasible. Depending on the function of the control valve, this can also be designated as a tumble valve or swirl flap.

Since such an intake module should be produced in large numbers and as cheaply as possible, additional problems are obtained with the mounting of the control shaft on the housing. The housing which is usually injection-moulded from plastic can be distorted due to production which can adversely affect mounting of the control shaft with the lowest possible friction. As a result however there is the risk of the functional reliability of the control shaft being adversely affected. Accordingly, the expenditure for achieving a functionally reliably mounting of the control shaft on the housing is comparatively high. Additional problems can arise, for example, during subsequent installation of the control shaft in the housing if the installation should be carried out, for example, on a connection side of the flange section provided for connection of the housing to the internal combustion engine. Warpage of the housing results in relatively high manufacturing tolerances which make functionally reliable assembly of the control shaft difficult.

These problems not only occur in intake modules with controllable outlet openings but in all intake modules in or on the housing of which controllable openings are provided. Accordingly, the present invention is not restricted to intake modules with controllable outlet openings but relates to all intake modules which have or contain controllable openings. Thus, it also relates to intake modules which have bypass openings in the interior thereof, which can be opened and closed for switching intake tube lengths. To this end, such a control device can also be used to control the cross-sections of these bypass openings through which flow can take place.

Known from DE 44 99 626 T1 is an intake module for a fresh air system of an internal combustion engine which is provided with a housing which has an inlet opening for fresh air and a flange section with a plurality of outlet openings for fresh air. The known intake module has switchable intake tube lengths whose effective length is switched by opening and closing bypass openings. To this end, the intake module is also fitted with a control device for controlling a cross-section of these bypass openings through which flow can take place. The control device comprises a control shaft and a plurality of control valves for the bypass openings arranged in a rotationally fixed manner on the control shaft. The control shaft is rotationally mounted about an axis of rotation on the housing by means of at least one bearing bracket. The housing has at least one bearing receiving portion for receiving the respective bearing bracket which has an insertion opening. In this case, the respective bearing bracket is inserted in an insertion direction oriented perpendicularly to the axis of rotation through the respective insertion opening into the appurtenant bearing receiving portion. The respective bearing bracket has two bearing parts, namely a first bearing part and a second bearing part. The two bearing parts each have an inner surface which face one another in relation to a transverse direction oriented perpendicular to the axis of rotation and perpendicular to the insertion direction which extend perpendicularly to the transverse direction and which abut against one another in a flat manner. In the known intake module the bearing parts each have a bearing region. The two bearing regions are configured so that a linear and radially pre-stressed contact to the control shaft is obtained at a plurality of points distributed in the circumferential direction.

SUMMARY

The present invention is concerned with the problem of providing an improved embodiment for an intake module of the type mentioned previously which in particular is characterized by a reduced manufacturing expenditure. Furthermore, an improved mounting of the control shaft and/or an increased functional reliability of the control device are strived for.

The present invention relates to two fundamental aspects which are independent of one another, i.e. can be used alternatively, but which preferably can also be combined with one another. In particular, the one aspect including its embodiments can be arbitrarily combined with the other aspect and its embodiments.

The problem forming the basis of the invention is solved by said aspects, but in particular by the subject matter of the independent claim. Advantageous embodiments are obtained in particular from the dependent claims.

The present invention is based on the general idea of providing at least one bearing bracket for the mounting of the control shaft which represents a separate component in relation to the housing and in relation to the control shaft and in which the control shaft is rotatably mounted about an axis of rotation running concentrically to the control shaft. For the respective bearing bracket the housing has a bearing receiving portion for receiving the bearing bracket. In this case, the bearing receiving portion is open on the connecting side of the flange section so that the bearing bracket can be inserted into the respective bearing receiving portion through an insertion opening provided on the connecting side. In this case, the respective bearing bracket is inserted in an insertion direction through the respective insertion opening into the appurtenant bearing receiving portion, wherein this insertion direction is oriented substantially perpendicular to the axis of rotation. By using such a separate bearing bracket, the mounting function is separate from the housing. In particular, such bearing brackets can be produced with significantly narrower manufacturing tolerances than the comparatively large housing. Thus, the mounting of the control shaft can be improved with the aid of such separate bearing brackets.

Preferably a plurality of bearing brackets are used, i.e. two or more bearing brackets which are each inserted into its own bearing receiving portion. The control shaft can comprise a continuous one-part shaft body which, for example, is formed by a metal rod, onto which the plastic control valves can be injection-moulded. It is also feasible to provide a multipart shaft body for the control shaft, which is composed of a plurality of rod-shaped sections. The individual shaft body sections can, for example, be fastened to one another by injection-moulded control valves.

According to a first aspect of the present invention, in order to solve the said problem it can be provided that the respective bearing bracket is provided with at least two position blocks which cooperate with complementary guide contours formed in the appurtenant bearing receiving portion for alignment of the bearing bracket when the bearing bracket is inserted in the bearing receiving portion. An optimal alignment of the mounting on the control shaft can be achieved by this means. In particular, a particularly low-friction mounting can be achieved for the control shaft and therefore a comparatively high functional reliability for the control shaft.

In detail, it is proposed according to the first aspect to provide the respective bearing bracket on its outer side with two outer surfaces, which face away from one another in a transverse direction which runs substantially perpendicular to the axis of rotation and substantially perpendicular to the insertion direction and which each have at least one position block projecting therefrom. The respective bearing receiving portion then has on its inner side for the respective position block a complementary guide contour for alignment of the bearing bracket in a longitudinal direction running parallel to the axis of rotation and in the transverse direction.

The respective position block is expediently formed integrally on the bearing bracket, i.e. produced of the same material therewith.

According to an advantageous embodiment, the respective position block has two flat longitudinal positioning surfaces facing away from one another in relation to the longitudinal direction which extend parallel to one another and perpendicular to the longitudinal direction. Expediently on its inner side for the respective position block the respective bearing receiving portion has two flat longitudinal guide surfaces facing one another in relation to the longitudinal direction, which extend parallel to one another and perpendicular to the longitudinal direction and against which each one of the longitudinal positioning surfaces of the respective position block abuts in a flat manner. This measure results in a particularly efficient and reliable alignment of the respective bearing bracket in the longitudinal direction. In other words, the axis of rotation defined in the respective bearing bracket is aligned with the aid of the longitudinal positioning surfaces and the longitudinal guide surfaces parallel to the longitudinal direction.

In an advantageous embodiment, the respective position block can have a flat transverse positioning surface which extends perpendicular to the transverse direction. The appurtenant bearing receiving portion on its inner side for the respective position block can then expediently have a flat transverse guide surface which extends perpendicular to the transverse direction and against which the transverse positioning surface of the respective position block abuts in a flat manner. This measure results in an optimized alignment of the respective bearing bracket in relation to the transverse direction. In other words, the axis of rotation defined by the respective bearing bracket is centred by the transverse positioning surfaces which cooperate with the transverse guide surfaces.

According to another advantageous embodiment, on each of its outer surfaces the respective bearing bracket can have at least two such position blocks which are spaced apart from one another in the insertion direction. This results in a particularly efficient alignment of the bearing brackets inside the respective bearing receiving portion.

A further improvement is obtained according to a further development in which on the respective outer surface, at least two such position blocks are arranged in alignment with one another in the insertion direction. This simplifies the configuration of the appurtenant guide contour inside the bearing receiving portion.

Furthermore, it can expediently be provided that the preceding position block in the insertion direction has smaller dimensions than the following position block in the insertion direction. As a result, the position blocks cooperate separately with the appurtenant guide contours, which improves a reliable alignment of the bearing brackets.

In particular, it can be provided that in the preceding or foregoing smaller-dimensioned position block a spacing of the longitudinal positioning surfaces measured parallel to the longitudinal direction is smaller than in the following larger-dimensioned position block. Furthermore, it can be provided that a distance of the transverse positioning surface from the respective outer side of the bearing bracket measured parallel to the transverse direction in the preceding smaller-dimensioned position block is smaller than in the following larger-dimensioned position block.

According to another advantageous embodiment, one position block can be arranged in the insertion direction between the control shaft and the other position block. By this means with the aid of the respective bearing bracket the control shaft can be inserted comparatively deeply into the flange section. As a result, in particular larger control valves can be used.

Alternatively in another embodiment it can be provided to arrange the control shaft between the two position blocks in relation to the insertion direction, with the result that a particularly secure alignment of the control shaft is possible.

In another embodiment, the respective bearing bracket can have at least two position blocks spaced apart in the longitudinal direction on both outer surfaces. Whereas with only one position block the bearing bracket overall can have a comparatively small or compact structure in the longitudinal direction, the provision of at least two position blocks spaced apart in the longitudinal direction makes it possible to have a comparatively wide or large bearing bracket in relation to the longitudinal direction. The larger the bearing bracket in the longitudinal direction, the more efficient is the alignment of the bearing shaft. Furthermore, larger bearing forces can be supported in a wide bearing console. Expediently the two position blocks can be arranged in alignment with one another on the respective outer surface in the longitudinal direction.

In another embodiment, on each outer surface at least one such position block can have a preceding stop surface in the insertion direction, which extends perpendicular to the insertion direction and which abuts flat against a flat mating stop surface, which is configured on the inner contour of the respective bearing receiving portion. As a result of the interplay of the respective stop surface with the appurtenant mating stop surface, the insertion direction of the bearing bracket is defined or delimited to a predetermined insertion depth. Consequently, the bearing bracket is aligned by this means in relation to the insertion direction. In other words, as a result of the interplay of stop surface and mating stop surface, the axis of rotation defined with the aid of the bearing console is centred in relation to the insertion direction.

According to a second aspect of the present invention, the basic problem can be solved by dividing at least one such bearing bracket into at least two bearing parts. The respective bearing bracket therefore has a first bearing part and a second bearing part. Preferably the bearing bracket has only two bearing parts so that it is designed as two-part. The at least two bearing parts of the divided bearing bracket can thereby form separate components. They can however also be movably connected to one another, for example, via a film hinge. In particular, the bearing parts of the dividing bearing bracket can be produced in one piece in a common injection moulding tool, i.e. joined by the same material. It is important that the first bearing part is movable relative to the second bearing part at least for the assembly of the bearing bracket relative to one another.

According to the second aspect, the invention is based on the general idea of supporting the two bearing parts flat against one another on flat positioning surfaces, whereby a predetermined alignment of the two bearing parts relative to one another can be achieved comparatively exactly. By this means, the control shaft can be reliably rotatably mounted within the bearing bracket. In particular, an unreliably high radial pressing of the control shaft in the bearing bracket can be avoided which can easily be the case with non-optimally aligned bearing parts. In this respect, the second aspect results in a simplified structure and in particular an improved shaft mounting with increased functional reliability.

In detail, the second aspect proposes to provide the first bearing part with a first bearing section which defines a first circumferential section on which the control shaft rests flat whilst the second bearing part has a second bearing section opposite the first bearing section which defines a second circumferential section opposite the first circumferential section on which the control shaft rests in a flat manner. Furthermore, the two bearing parts each have an inner surface which face one another in relation to the transverse direction already mentioned previously for the first aspect, which runs substantially perpendicular to the axis of rotation and substantially perpendicular to the insertion direction and which each have at least one flat positioning surface which extends substantially perpendicularly to the transverse direction. As mentioned, at least one such positioning surface of the first bearing part rests flat against at least one such positioning surface of the second bearing part.

The preceding features of the second aspect of the present invention and the subsequently explained embodiments to the second aspect can be arbitrarily combined with the features of the first aspect and with the previously described embodiments of the first aspect.

According to an advantageous embodiment, the respective positioning surface can be raised from the respective inner surface, i.e. spaced apart from this in the transverse direction. As a result, it can be achieved that the two bearing parts in the region of the mutually facing inner surfaces are exclusively in contact with one another at the positioning surfaces. This does not eliminate the fact that the two bearing parts are for example connected to one another via a film hinge and/or can in principle also abut against one another in the region of the bearing sections.

An embodiment in which the two bearing parts outside the bearing sections in the region of the inner surfaces are exclusively in contact with one another via the positioning surfaces in the transverse direction is therefore particularly advantageous. In particular, it can be provided that a gap is formed in the transverse direction between the inner surfaces outside the positioning surfaces. Additionally or alternatively it can be provided that one gap is formed in each case in the insertion direction on both sides of the positioning surfaces abutting against one another in the transverse direction between the inner surfaces. In each of these cases it is achieved that the positioning of the two bearing parts on one another is accomplished by direct contact at the flat positioning surfaces which can be fabricated with comparatively narrow tolerances.

According to an advantageous further development, it can be provided that the respective gap completely penetrates the respective bearing bracket in a longitudinal direction running parallel to the axis of rotation. Thus, perturbing interactions in the transverse direction by contact of the bearing parts outside the positioning surfaces are eliminated.

It can optionally be provided that the two bearing parts do not contact one another on a side of the control shaft facing away from the positioning surfaces. Thus, a perturbing interaction is also eliminated in this region.

It can advantageously be provided that the two bearing parts each have a separating edge, in particular a tear-off edge on the side of the control shaft facing away from the positioning surfaces. These separating edges can be formed by the residue of a connection, in particular a film hinge. This connection can be provided during manufacture of the cohesive bearing parts. This connection can be separated before combining the two bearing parts to form the bearing bracket, e.g. by cutting or tearing. This connection can also be separated during combining of the two bearing parts to form the bearing bracket. For example, the film hinge tears of its own accord when the bearing parts are closed around the control shaft to form the bearing bracket. An embodiment is therefore expedient in which the two bearing parts are separate modules at least when the bearing bracket is inserted in the bearing receiving portion. Separate bearing parts can be positioned with respect to one another unhindered by the positioning surfaces.

According to another advantageous embodiment, it can be provided that at least two such positioning surfaces are formed in each case at the two bearing parts on the respective inner surface, which improves an optimal alignment of the two bearing parts with respect to one another. Expediently, the two positioning surfaces of the respective bearing part can be spaced apart from one another in the insertion direction. It is also feasible to provide the two positioning surfaces at the respective inner surface spaced apart from one another in the longitudinal direction. It is also feasible that more than two, for example, three or four or more such positioning surfaces are provided on the respective inner surface, wherein in particular it can be provided that at least two such positioning surfaces are spaced apart from one another in the insertion direction and two such positioning surface are spaced apart from one another in the longitudinal direction. A spacing in the longitudinal direction is then provided if the respective bearing bracket should be comparatively large or wide in the longitudinal direction.

In another embodiment, the first bearing part can have at least one guide pin protruding in the transverse direction on its inner surface whereas the second bearing part has on its inner surface at least one guide opening complementary to the appurtenant guide part oriented in the transverse direction, into which the appurtenant guide pin is inserted in the transverse direction. As a result of the guide pin cooperating with the respective opening, a predefined alignment of the two bearing parts relative to one another is also achieved. In addition, guide pin and guide opening with suitable fit, which preferably comprises a press fit, can achieve a satisfactory fixing of the two bearing parts on one another. Such a guide pin can preferably be formed integrally on the respective bearing part, i.e. can be produced of the same material.

According to an advantageous further development, the respective guide pin can be bordered by the respective positioning surface so that the respective guide pin protrudes from the respective bearing part inside the positioning surface. Likewise, the respective guide opening can be bordered by the respective positioning surface. In this case, the guide opening is introduced into the respective bearing part inside the positioning surface. This results in a particularly compact design for the bearing bracket.

In another advantageous embodiment, the first bearing part can have at least two such guide pins which are spaced apart from one another in the insertion direction and/or in the longitudinal direction. The second bearing part then has at least two such guide openings complementary to the guide pins which are also spaced apart from one another in the insertion direction and/or in the longitudinal direction. This measure also results in an improvement in the alignment of the two bearing parts with respect to one another. By this means a bearing bracket having a large size in the longitudinal direction can also be achieved.

It can further be provided that the second bearing part has at least one guide pin which is inserted in a guide opening formed on the first bearing part. Preferably however the guide pins are formed exclusively on the first bearing part whilst the guide openings are formed exclusively on the second bearing part.

According to another advantageous embodiment, the first circumferential section or the second circumferential section can be greater than 180° so that the bearing shaft inserted in the appurtenant bearing section is clasped therein. Expediently the first bearing section formed on the first bearing part is formed so that the first circumferential section is greater than 180°. The larger circumferential section extends for example over a maximum of 240° and can for example be about 200°.

A further embodiment is obtained if respectively one gap is provided in the circumferential direction between the first bearing section and the second bearing section. By this means an alignment of the two bearing sections relative to one another can be achieved by contacting the positioning surfaces on one another.

An embodiment in which the bearing parts do not contact in the area of the bearing sections is advantageous. This results in an optimal alignment of the bearing sections relative to one another through cooperation of the positioning surfaces abutting against one another. A functional separation within the bearing bracket is also achieved as a result since the positioning surfaces align the bearing sections relative to one another whilst the bearing section bring about the mounting of the control shaft.

Another embodiment provides that the two bearing sections are not the same size, i.e. define different-sized circumferential sections. The bearing part with the larger bearing section has a projection which increases the bearing section in the circumferential direction laterally on its inner surface. The bearing part with the smaller bearing section has a recess which reduces the bearing section in the circumferential direction, into which the projection engages laterally on its inner surface. This results in a particularly compact design.

According to an advantageous further development, it can be provided that the two bearing parts do not contact each other in the region of the projection and the recess. This measure also simplifies an alignment of the two bearing sections relative to one another when the positioning surfaces come to rest against one another.

An embodiment in which the positioning surfaces abut against one another in a position plane in which the axis of rotation also lies is particularly advantageous. Thus, the axis of rotation can be centred with the aid of the abutting position surface.

Subsequently another advantageous embodiment with relevant further development is described in detail which can be arbitrarily combined with the features of the first aspect and its embodiments described further above and arbitrarily with the features of the previously described second aspect and its embodiments.

Said further embodiment starts from the fact that the flange section on its connection side is fitted with at least one sealing groove for receiving a seal, wherein the seal abuts sealingly against the internal combustion engine in the state connected to the internal combustion engine. According to said embodiment, it is now proposed to arrange at least one such bearing receiving portion in a section of the sealing groove in such a manner that the sealing groove has a groove opening in the region of this bearing receiving portion. It is further proposed that at least one such bearing bracket has a groove section in the region of the sealing groove which completes the sealing groove in the region of the aforesaid groove opening. In this way, the groove section formed on the respective bearing bracket can complete the adjoining sealing groove quasi interruption-free and preferably flush so that in the mounted state the seal inserted therein can be guided without interruption. This measure has the advantage that in particular between adjacent outlet openings, a distance in the longitudinal direction can be selected to be particularly small. In particular, the control shaft can be inserted through such a bearing receiving portion in the region of the seal. A further advantage of this embodiment is seen in that the bearing bracket inserted in the bearing receiving portion is held captively with the aid of the seal on the flange section, namely by means of the sealing section guided through the groove section. As a result, the intake module can be prepared largely completely as an assembly which simplifies its mounting on the internal combustion engine. In the attached state, the pressing of the seal produces a pre-tensioning force which drives the bearing bracket into the bearing receiving portion in the insertion direction, which also assists a secure positioning of the bearing bracket relative to the housing.

According to an advantageous further development, at least one such position block can have a retaining surface facing away from the control shaft which adjoins a groove base of the groove section in a flush manner. In this way, the respective position block with its retaining surface forms a section of the groove base of the sealing groove which here allows a simplified assembly or an improved positioning of the bearing bracket in the flange section.

In a preferred embodiment the bearing bracket is configured as an injection moulded part. The usual demoulding slopes for removal of the finished plastic part from the injection moulding tool are arranged as generally usual on the outer surfaces not provided for positioning. No demoulding slopes are provided on the positioning surfaces or guide pins required for positioning of the bearing bracket in the intake module or on the two bearing parts. Thus, these surfaces can be produced very precisely and can thus enable a very exact positioning. The proportion of the positioning surfaces is less than 20%, in particular less than 10% of the entire component surface. As a result of the small fraction of the total surface, problem-free removal of the injection-moulded bearing brackets from the tool is nevertheless possible.

For the two previously described aspects, it can be provided according to an advantageous embodiment that the housing has at least one inlet opening for fresh air and a flange section which has the controllable openings which there form outlet openings for fresh air. Additionally or alternatively it can be provided that the bearing receiving portions are formed on a connecting side of the flange section provided for connection of the housing to the internal combustion engine.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically

DETAILED DESCRIPTION

Figure 1:
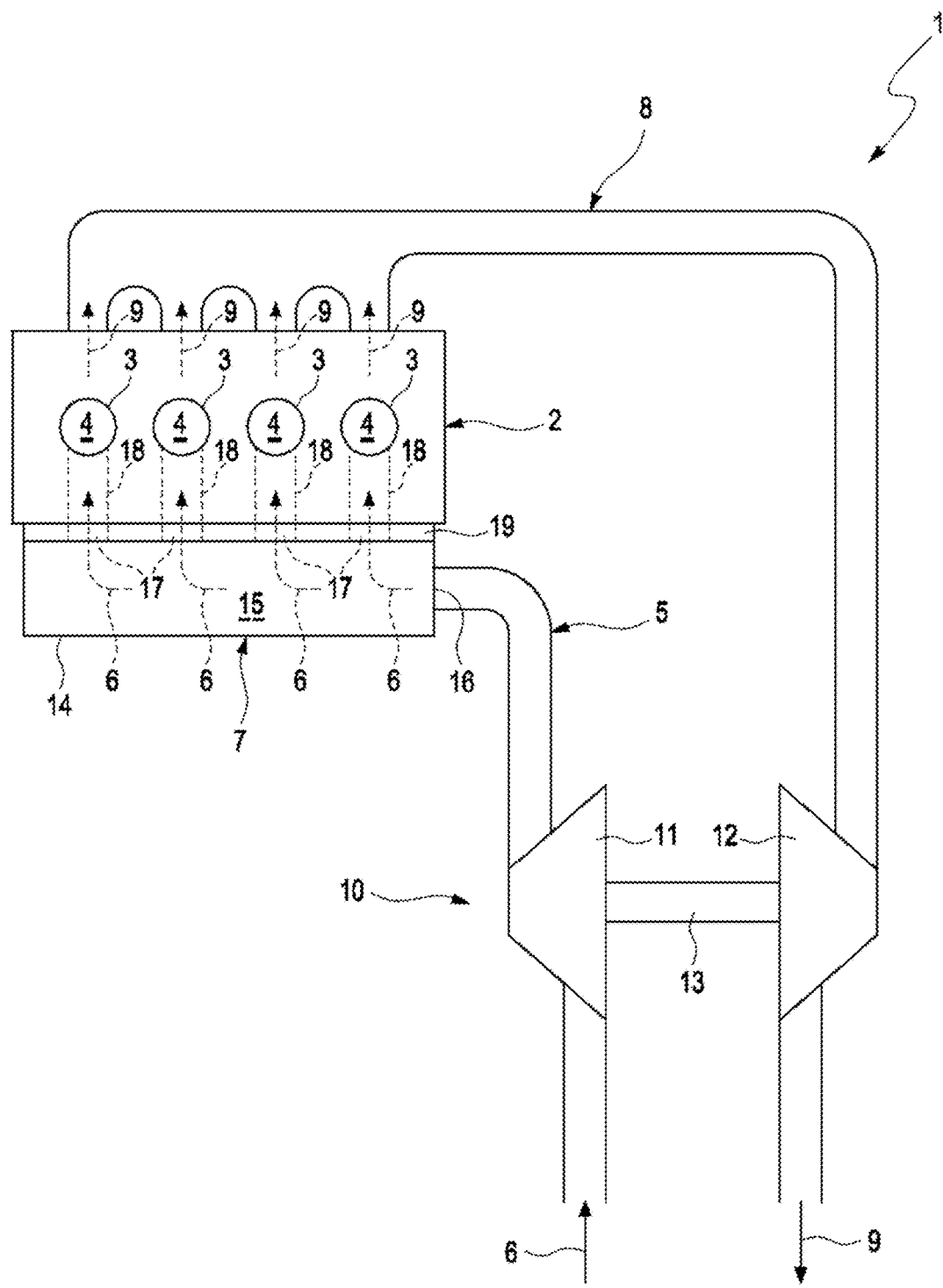
FIG. 1 shows a highly simplified circuit-diagram-like schematic diagram of an internal combustion engine with a fresh air system comprising an intake module.

According to FIG. 1, an internal combustion engine 1 comprises an engine block 2 which has a plurality of cylinders 3 which each contain a combustion chamber 4 of the internal combustion engine 1. Purely as an example and without restricting the generality, four cylinders are shown here. In an internal combustion engine 1 configured as a piston engine, a piston not shown here is arranged in each cylinder 3 in a stroke-adjustable manner. Fresh air is supplied to the combustion chambers 4 via a fresh air system 5. A corresponding fresh air flow 6 is indicated by arrows. The fresh air system 5 is connected to the internal combustion engine 1 or to the engine block 2 or fastened thereon via an intake module 7. Furthermore, an exhaust gas system 8 is provided via which combustion exhaust gases can be removed from the combustion chambers 4. A corresponding exhaust gas flow 9 is indicated by arrows.

In the example shown in FIG. 1 the internal combustion engine 1 comprises a charged internal combustion engine 1 since this is fitted with a charging device 10 which in the example comprises an exhaust gas turbocharger which can also be designated hereinafter by 10. The exhaust gas turbocharger 10 comprises in the usual manner a compressor 11 which is installed in the fresh air system 5 as well as a turbine 12 which is installed in the exhaust gas system 8. Compressor 11 and turbine 12 are for example drive-connected to one another by means of a common drive shaft 13. Alternatively the internal combustion engine 1 can also be operated as a non-charged internal combustion engine 1, i.e. can be designed as an intake engine.

Figure 2:
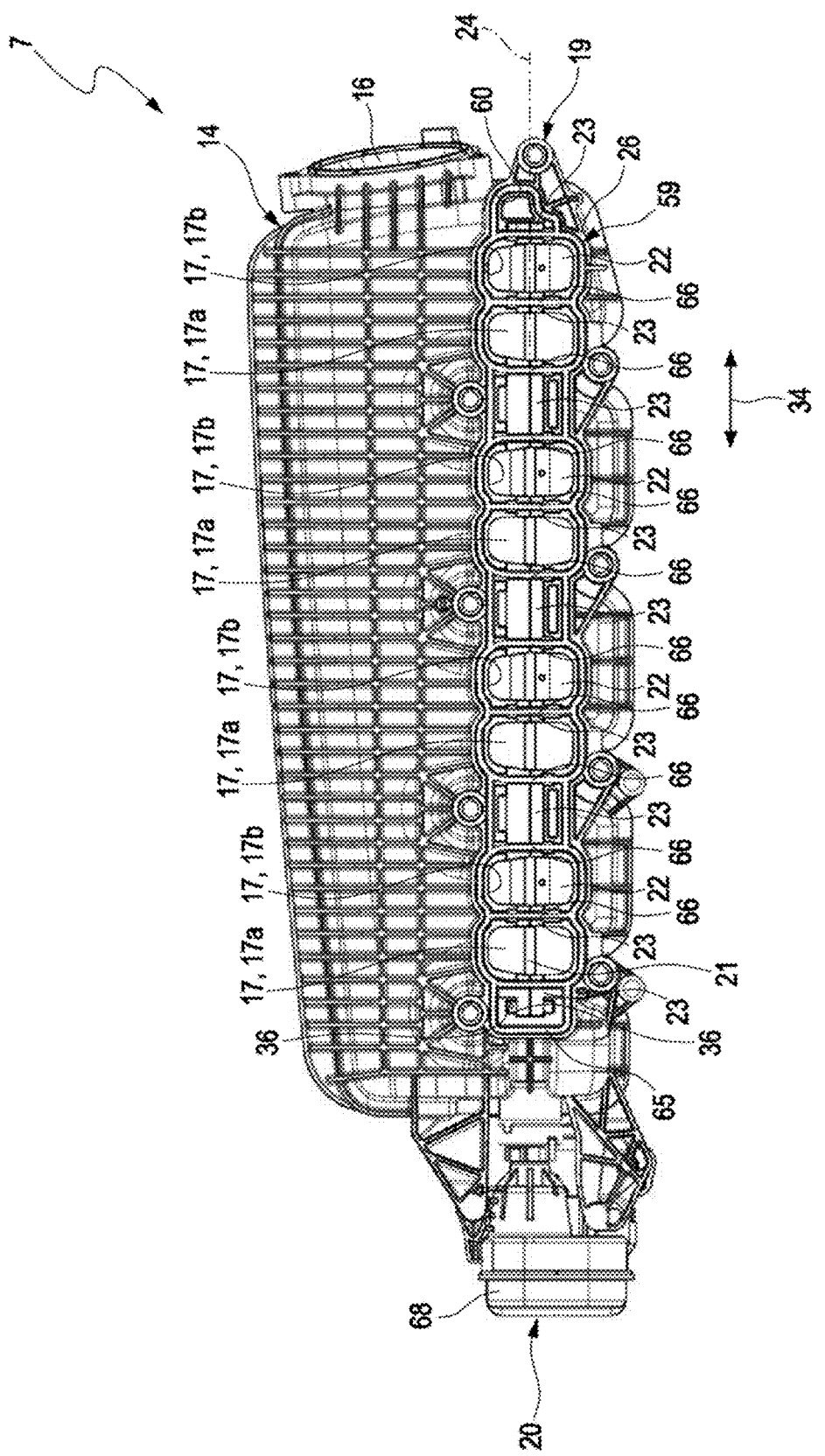
FIG. 2 shows a view of the intake module from below, FIGS. 3 to 5 each show an isometric view of a bearing bracket in a folded-out state in various embodiments, FIGS. 6 and 7 each show an isometric view of the bearing bracket in a folded-together state in the embodiments shown in FIGS. 4 and 5.

According to FIGS. 1 and 2, the intake module 7 has a housing 14 which encloses a distributor chamber 15. The housing 2 has an inlet opening 16 as well as a plurality of outlet openings 17. The fresh air flow 6 can enter into the distributor chamber 15 through the inlet opening 16. The fresh air flow 6 can exit from the distributor chamber 15 through the outlet openings 17 and flow into the respective combustion chamber 4 via corresponding fresh air channels 18 formed in the engine block 2. Gas change valves for controlling gas change processes are not shown here.

The housing 14 has a flange section 19 by means of which the housing 14 or the intake module 7 can be fastened to the engine block 2 or can be connected to the internal combustion engine 1. Expediently the flange section 19 is formed integrally on the housing 14, i.e. is made of the same material.

According to FIG. 2, the intake module 7 is additionally fitted with a control device 20 with the aid of which the cross-section through which flow can take place can be controlled at least on one of the outlet openings 17. It is clear that in another embodiment, the cross-section of an arbitrary other opening through which flow can take place can be controlled by means of the flow device 20 so that the following description can also be applied accordingly to an intake module 7 with different controllable openings.

In the example of FIG. 2, each cylinder 3 or each combustion chamber 4 is assigned two outlet openings 17, wherein in each case only one of these two outlet openings 17 can be controlled with the aid of the control device 20 whereas the respectively other outlet opening 17 is uncontrolled, i.e. permanently open. The uncontrolled outlet openings 17 are additionally designated with 17a in FIG. 2. The outlet openings 17 which can be controlled or are controlled with the aid of the control device 20 are additionally designated with 17b in FIG. 2. The control device 20 has at least one control shaft 21 which bears a control valve 22 for at least one controlled outlet opening 17b, which is arranged in a rotationally fixed manner on the control shaft 21. A corresponding adjusting device 68 is provided for rotating drive of the control shaft 21. In the example in FIG. 2, a single common control shaft 21 is provided for all the controllable outlet openings 17b which bears one control valve 22 each for all the controllable outlet openings 17b. Whereas the control shaft 21 is expediently made of a metal, the control valves 22 are preferably made of a plastic wherein the control valves 22 can be directly injection-moulded onto the control shaft 21. The control shaft 21 is mounted rotatably about an axis of rotation 24 by means of a plurality of bearing brackets 23 on the housing 14. The control shaft 21 is expediently rectilinear so that the axis of rotation 24 extends concentrically to the control shaft 21.

Figure 8:
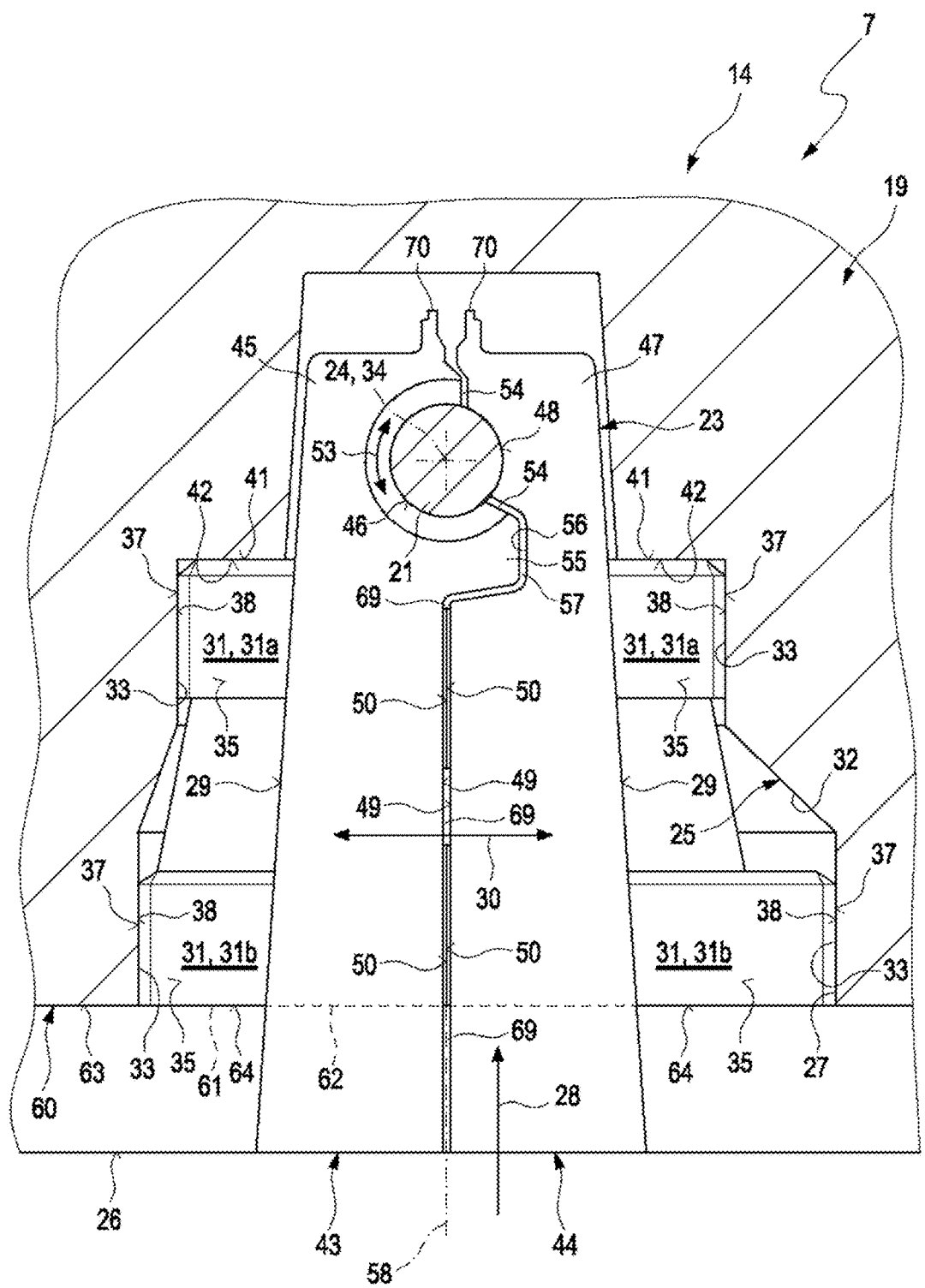
FIG. 8 shows a cross-section of the intake module in the region of a bearing bracket wherein a housing of the intake module is shown in cutaway view whilst the bearing bracket is reproduced in a side view.

FIG. 8 shows a simplified cross-section of the intake module 7 through the housing 14 in the region of the flange section 19 perpendicular to the axis of rotation 24 and specifically in the region of such a bearing bracket 23, wherein the bearing bracket 23 itself is not shown cutaway but in a side view whose viewing direction runs parallel to the axis of rotation 24. It can be seen that in the region of the flange section 19 for each bearing bracket 23 the housing 14 has an appurtenant bearing receiving portion 25. The respective bearing receiving portion 25 has an insertion opening 27 on a connecting side 26 of the flange section 19 so that the respective bearing receiving portion 25 is open on the connecting side 26. The connecting side 26 is used to connect the housing 14 to the internal combustion engine 1 or its engine block 2, wherein the connecting side 26 is facing the engine block 2 or is arranged on a side of the connecting flange 19 facing away from the housing 14. The respective bearing bracket 23 is introduced in an insertion direction 28 indicated by an arrow through the insertion opening 27 into the bearing receiving portion 25. The insertion direction 28 is thereby oriented perpendicular to the axis of rotation 24.

According to FIGS. 6 to 8, the respective bearing bracket 23 has two outer surfaces 29 on its outer side which face away from one another in relation to a transverse direction 30 indicated by a double arrow in FIGS. 6 to 8. The transverse direction 30 runs perpendicular to the axis of rotation 24 and perpendicular to the insertion direction 28. On each of these two outer surfaces 29 the bearing bracket 23 has at least one position block 31 projecting from the respective outer surface 29 in each case. Complementary to the position blocks 31, the bearing receiving portion 25 has a guide contour 33 on its inner side 32 for aligning the bearing bracket 23 relative to the transverse direction 30 and relative to a longitudinal direction 34, which is indicated by a double arrow in FIGS. 6 and 7 and which extends parallel to the axis of rotation 24. The respective position block 31 has two flat longitudinal positioning surfaces 35 facing away from one another in relation to the longitudinal direction 34 which extend parallel to one another and perpendicular to the longitudinal direction 34. Only the longitudinal positioning surfaces 35 facing the observer can be identified in each case in FIGS. 6 to 8. The longitudinal positioning surfaces 35 facing away from the observer are indicated by broken reference line in FIG. 7.

The bearing receiving portion 25 or the respective guide contour 33 has on the inner side 32 for the respective position block 31 two flat longitudinal guide surfaces 36 which can only be seen in FIG. 2. The longitudinal guide surfaces 36 are facing one another in relation to the longitudinal direction 34 and extend parallel to one another as well as perpendicular to the longitudinal direction 34. In the installed state the longitudinal positioning surfaces 35 of the respective position block 31 abut flat against the respective longitudinal guide surface 36 in a flat manner.

Furthermore, the respective position block 31 is here fitted with a flat transverse positioning surface 37 which extends perpendicularly to the transverse direction 30 and is thereby facing away from the remaining bearing bracket 23 in relation to the transverse direction 30. Complementary to these transverse positioning surfaces 37 the bearing receiving portion 25 has on its inner side 32 or on its guide contour 33 for the respective position block 31 a flat transverse guide surface 38 which extends perpendicular to the transverse direction 30 and on which the respective transverse positioning surface 37 of the respective position block 31 abuts in a flat manner. Whereas the aforesaid longitudinal positioning surfaces 35 with the longitudinal guide surfaces 36 bring about an alignment of the bearing bracket 23 in relation to the longitudinal direction 34, the transverse positioning surfaces 37 combined with the transverse guide surfaces 38 produce an alignment of the bearing bracket 23 in relation to the transverse direction 30.

In the examples shown here the respective bearing bracket 23 has at least two such position blocks 31 on each of its two outer surfaces 29, which are spaced apart from one another in the insertion direction 28. Accordingly in order to distinguish the two position blocks 31 the preceding position block 31 during insertion of the bearing bracket 23 in the bearing receiving portion 25 can hereinafter be designated as preceding or foregoing position block 31a whereas the following position block 31 during insertion can hereinafter also be designated as following position block 31b. Expediently the two position blocks 31a, 31b are arranged in alignment with one another on the respective outer surface 29 in the insertion direction 28. In this case, the preceding position block 31a has smaller dimensions than the following position block 31b. Expediently the smaller preceding position block 31a has smaller dimensions both in the longitudinal direction 34 and in the transverse direction 30 than the larger following position block 31b. For example, according to FIG. 6, a longitudinal spacing 39 which the two longitudinal positioning surfaces 35 of the respective position block 31 have from one another is smaller for the preceding position block 31a than for the following position block 31b. Furthermore a transverse spacing 40 of the respective transverse positioning surface 37 from the appurtenant outer surface 29 from which the respective position block 31 protrudes, measured parallel to the transverse direction 30 is smaller for the preceding position block 31a than for the following position block 31b.

In the embodiments shown here, the preceding position block 31a is arranged between the control shaft 21 and the following position block 31b in relation to the insertion direction 28, with the result that the control shaft 21 can achieve a particularly great distance from the connecting side 26 which corresponds to a large penetration depth. This is advantageous for achieving comparatively large control valves 22.

Whereas the embodiment of the bearing bracket 23 shown in FIG. 6 only has two position blocks 31 on each outer side 29, in the embodiment shown in FIG. 7, four such position blocks 31 are provided on each outer side 29. Thus, on the respective outer surface 29 at least two such position blocks 31 are spaced apart from one another in the longitudinal direction 34. In detail two preceding smaller position blocks 31a spaced apart from one another in the longitudinal direction 34 and two following larger position blocks 31b are provided.

Furthermore, in the bearing brackets 23 shown here it is provided that at least in one of the position blocks 31, namely in the preceding position blocks 31a in each case, a preceding flat stop surface 41 is formed in the insertion direction 28, which extends perpendicularly to the insertion direction 28. Complementary thereto the bearing receiving portion 25 has on its inner side 32 for the respective position block 31, here for the respective foregoing position block 31a, a flat mating stop surface 42 on which the stop surface 41 abuts flat as soon as the bearing bracket 23 has achieved a predetermined insertion depth in the bearing receiving portion 25.

Additionally or alternatively to the previously described features, the respective bearing bracket 23 has two bearing parts, namely a first bearing part 43 and a second bearing part 44. The first bearing part 43 has a first bearing section 45 against which the control shaft 27 abuts with a first circumferential section 46. The second bearing part 44 has a second bearing section 47 which lies opposite the first bearing section 45 and against which the control shaft 21 abuts with a second circumferential section 48 which for its part lies opposite the first circumferential section 46. Both bearing parts 43, 44 each have an inner surface 49 laterally adjoining the respective bearing section 45, 47, which face one another in relation to the transverse direction 30. In each case, at least one flat positioning surface 50 is formed on the respective inner surface 49 which extends in each case perpendicular to the transverse direction 30. In the folded-together state of FIGS. 6 to 8 or in the installed state of FIG. 8, the respective positioning surface 50 of the first bearing part 43 abuts flat against at least one positioning surface 50 of the second bearing part 44. As a result, the two bearing parts 43, 44 are optimally aligned with respect to one another in relation to the transverse direction 30.

The positioning surfaces 50 of the two bearing parts 43, 44 abut against one another in a position plane 58. Expediently the positioning surfaces 50 are thereby arranged on the bearing parts 43, 44 so that the axis of rotation 24 defined by the bearing bracket 43 lies in the positioning plane 58.

According to FIG. 8, in the examples presented here it is additionally provided that the two bearing parts 43, 44 outside the bearing sections 45, 47 in the region of the inner surfaces 49 are exclusively in contact with one another via the positioning surfaces 50 in the transverse direction 30. In consequence, a gap 69 is formed in the transverse direction 30 between the inner surfaces 49 outside the positioning surfaces 50. It can also be seen that in the insertion direction 28 on both sides of the mutually abutting positioning surfaces 50, i.e., in FIG. 8 above and below the positioning surfaces 50, such a gap 69 is formed in each case in the transverse direction 30 between the inner surfaces 49. In addition, it can be seen that the respective gap 69 in the longitudinal direction 34 penetrates completely through the respective bearing bracket 23.

The positioning surfaces 50 are located on one side of the bearing parts 43, 44 in relation to the control shaft 21. This side is located in FIG. 8 below the control shaft 21. In addition, it can be seen that it is now provided that the two bearing parts 43, 44 on a side of the control shaft 21 facing away from the positioning surfaces 50, i.e. above the control shaft 21 in FIG. 8 do not touch. Thus, the radial gap 54 described further above continues as far as the preceding end of the bearing bracket 23 in the insertion direction 28. There, at this preceding end it can also be seen that the two bearing parts 43, 44 each have a separating or tear-off edge 70 on the side of the control shaft 21 facing away from the positioning surfaces 50. Accordingly, at least in the bearing bracket 23 inserted in the bearing receiving portion 25 the two bearing parts 43, 44 are separate components.

According to FIGS. 3 to 5, the first bearing part 43 on its inner surface 49 has at least one guide pin 51 projecting in the transverse direction 30. These guide pins 51 cannot be seen in the folded-together state of FIGS. 6 to 8. The respective second bearing part 43 according to FIGS. 3 to 5 has on its inner surface 49 at least one guide opening 52 oriented in the transverse direction 30 which is formed complementary to the appurtenant guide pin 51. In the folded-together state of FIGS. 6 to 8, the respective guide pint 51 is inserted in the appurtenant guide opening 52 in the transverse direction 30. Also the guide openings 52 cannot be seen in FIGS. 6 to 8.

Expediently the positioning of the guide pins 51 on the respective inner surface 49 is accomplished to that the respective guide pin 51 is bordered by the respective positioning surface 50 and in particular is centred thereto. Accordingly the positioning openings 52 on the second bearing part 44 are bordered by the respective positioning surface 50 and in particular centred thereto. As can be deduced from FIGS. 3 to 5 and 8, the respective positioning surface 50 is raised from the appurtenant inner surface 49, i.e. spaced apart from this in the transverse direction 30.

In the embodiments shown here, at least two such positioning surfaces 50 are formed on both bearing parts 43, 33 on the respective inner surface 49, which can be arranged spaced apart from one another in the insertion direction 28 and/or in the longitudinal direction 34. FIG. 3 shows an embodiment in which the respective bearing part 43, 44 has precisely two positioning surfaces 50 which are spaced apart from one another in the longitudinal direction 34 and are also arranged in alignment with one another in relation to the longitudinal direction 34. In the embodiment shown in FIG. 4, in each case only two positioning surfaces 50 are also provided on the two bearing parts 43, 44, which in this case however are spaced apart from one another in the insertion direction 28 and are also arranged in alignment with one another in the insertion direction 28. FIG. 5 on the other hand shows an example in which the respective bearing part 43, 44 comprises four positioning surfaces 50 in each case, wherein two each in the insertion direction 28 and two each in the longitudinal direction 34 are spaced apart from one another and arranged in alignment with one another. In the examples in FIGS. 3 to 5, precisely two guide pins 51 and precisely two guide openings 52 are provided in each case.

As can be deduced particularly clearly from FIG. 8, in the embodiments of the bearing bracket 23 shown here, the first circumferential section 46 defined by the first bearing section 45 of the first bearing part 43 is greater than 180° and in the example is about 225°. The second circumferential section 48 defined by the second bearing section 47 of the second bearing part 44 is on the other hand smaller than 180° and in the example shown is about 120°. As a result, the control shaft 21 can be clipped on the first bearing section 45 whilst the second bearing section 47 in the folded-together state of the bearing bracket 23 secures the control shaft 21 in the first bearing section 45. In the example shown, it is also provided that the sum of the first circumferential section 46 and the second circumferential section 48 is less than 360°. Further, the two bearing sections 45, 47 are positioned relative to one another so that in the circumferential direction 53 of the control shaft 21 indicated by a double arrow in FIG. 8, a gap 54 is formed in each case between the first bearing section 45 and the second bearing section 47 so that the bearing parts 43, 44 do not touch in the region of the bearing sections 45, 47. A projection 55 is formed on the first bearing part 53 in the region of the first bearing section 45, which enlarges the first bearing section 45 in the circumferential direction 53 so that the projection 55 covers or defines a part of the first circumferential section 46. The second bearing part 44 possesses a recess 56, i.e., an indentation or depression, in the region of the second bearing section 47. The recess 56 results in a reduction in the second circumferential section 48. Furthermore the projection 55 engages in this recess 56. The positioning of the projection 55 in the recess 56 is configured so that the two bearing parts 43, 44 also do not touch in the region of the projection 55 and the recess 56. On the contrary, a gap 57 is also formed there between projection 55 and recess 56.

According to FIG. 2, the flange section 19 is provided with a seal 59 on its connecting side 26 facing the observer, with the aid of which the flange section 19 or the housing 14 is sealed with respect to the engine block 2 in the mounted state in order to avoid leakage of the fresh air supplied to the combustion chambers 4 into the surroundings. In order to receive the seal 59, a sealing groove 60 formed complementary to the seal 59 is incorporated in the connecting side 26 of the flange section 19, of which a section can be seen in FIG. 8. Expediently it can now be provided that at least one such bearing receiving portion 25 is arranged in a section of the sealing groove 60 in such a manner that the sealing groove 60 has a groove opening 61 in the region of this bearing receiving portion 25. The bearing bracket 23 inserted in this bearing receiving portion 25 is now configured so that it has a groove section 62 in the region of the sealing groove 60 which completes the sealing groove 60 in the region of the groove opening 61. Expediently the groove section 62 provided on the bearing bracket 23 completely completes the sealing groove 60 in the region of the groove opening 61 so that the seal 59 can come to abut seamlessly against a groove base 63 of the sealing groove 60. In the example of FIG. 8, it is additionally provided that the two following position blocks 31b each have a retaining surface 64 facing away from the control shaft 21 which adjoins the groove base 53 of the groove section 60 in a flush manner and thereby itself forms a section of the groove base 63 of the sealing groove 60. As a result, it is fundamentally possible to also make continuous contact with the seal 59 in the region of the groove opening 61. The seal 59 according to FIG. 2 has a circular section 65 which is guided around all the outlet openings 17 and around all the bearing receiving portions 25, and therefore borders or encloses these. Inside this circular section 65, the seal 59 has a plurality of webs 66 which are each guided through a groove opening 61, i.e. through a bearing receiving portion 25 and are there in contact with the appurtenant bearing bracket 23. In this case, these webs 66 are used during preassembly of the intake module 7 to secure the bearing brackets 23 inserted in the bearing receiving portions 25 on the flange section 19. In the attached state of the intake module 7, the webs 66 bring about a pre-tensioning of the bearing brackets 23 in the insertion direction 28, with the result that the bearing brackets 23 in particular come to abut against mating stop surfaces 42 in a pre-tensioned manner with their stop surfaces 41.

As can be deduced from FIGS. 3 to 5, the two bearing parts 43, 44 can preferably be produced in a joint injection moulding tool. In this case, the two bearing parts 43, 33 can also be produced in one piece, but connected movably to one another. For example, a film hinge 67 can be configured for this purpose at the transition between the two bearing parts 43, 44. The one-piece manufacture of the two bearing parts 43, 44 ensures that those bearing parts 43, 44 which have been made of identical material and under identical manufacturing conditions are always assembled to form a bearing bracket 23. The film hinge 67 can be configured so that it allows a pivoting movement of the two bearing parts 43, 44 relative to one another about a pivot axis running parallel to the axis of rotation 24, which is defined by the film hinge 67 in order to form the respective bearing bracket 23 or in order to produce the folded-together state of the bearing bracket 23. For the mounting of the control device 20, the required bearing brackets 23 can thus be clipped onto the control shaft 21 in the unfolded state shown in FIGS. 3 to 5 with their first bearing parts 43 at the corresponding position. The bearing brackets 23 can then be transferred into the folded-together state shown in FIGS. 6 to 8 in which the respective second bearing part 44 is pivoted around the film hinge 67 or about its pivot axis until the positioning surfaces 50 come to abut against one another. In so doing, the guide pins 51 are also inserted into the guide openings 52. In this case, it can be provided to dimension the film hinge 67 so that during assembly of the two bearing parts 43, 44 to form the bearing bracket 23 (folded-together state) it is destroyed so that the two bearing parts 43, 44 after assembly or after folding together the bearing brackets 23 are no longer interconnected via the film hinge 67. FIGS. 6 to 8 show embodiments in which after folding together the bearing brackets 23 the film hinge 67 is destroyed or no longer present. For example, the film hinge 67 tears if the bearing parts 43, 44 for assembly of the bearing bracket 23 are position on one another directly on the control shaft 21. In so doing, the separating or tear-off edge 70 mentioned further above and identifiable in FIGS. 6 to 8 can be produced. Alternatively the film hinge 67 can also be dimensioned so that it is not destroyed by folding together the bearing bracket 23 but a creates a resilient connection between the two bearing parts 43, 44 so that the bearing sections 45, 47 are adjustable relative to one another when folding together the bearing parts 43, 44 and the film hinge 67 does not hinder an alignment of the two bearing sections 45, 47 relative to one another.

The invention claimed is:

1. An intake module of a fresh air system for an internal combustion engine, comprising:
   a housing having a plurality of openings through which fresh air is flowable;
   a control device for controlling a cross-section of at least one of the openings through which flow can take place;
   wherein the control device includes at least one control shaft and at least one control valve arranged in a rotationally fixed manner on the control shaft for the at least one of the openings;
   wherein the at least one control shaft is rotationally mounted about an axis of rotation on the housing by at least one bearing bracket;
   wherein the housing has at least one bearing receiving portion for receiving the at least one bearing bracket, the at least one bearing receiving portion having an insertion opening;
   wherein the at least one bearing bracket is inserted in an insertion direction oriented perpendicularly to the axis of rotation through the insertion opening into the at least one bearing receiving portion;

wherein the at least one bearing bracket has a first bearing part and a second bearing part;

wherein the first bearing part has a first bearing section on which the control shaft rests with a first circumferential section;

wherein the second bearing part has a second bearing section opposite the first bearing section on which the control shaft rests with a second circumferential section opposite the first circumferential section;

wherein the two bearing parts each have an inner surface which face one another in relation to a transverse direction oriented perpendicular to the axis of rotation and perpendicular to the insertion direction and which each have at least one flat positioning surface extending perpendicularly to the transverse direction and raised from the inner surface;

wherein the at least one positioning surface of the first bearing part rests flat against the at least one positioning surface of the second bearing part; and wherein a gap is formed in the transverse direction between the inner surfaces outside the positioning surfaces.

2. The intake module according to claim 1, wherein the two bearing parts outside the bearing sections in a region of the inner surfaces are exclusively in contact with one another via the positioning surfaces in the transverse direction.

3. The intake module according to claim 1, wherein the gap is formed in the insertion direction on both sides of the positioning surfaces abutting against one another in the transverse direction between the inner surfaces.

4. The intake module according to claim 1, wherein the gap completely penetrates the at least one bearing bracket in a longitudinal direction running parallel to the axis of rotation.

5. The intake module according to claim 1, wherein the two bearing parts do not contact one another on a side of the control shaft facing away from the positioning surfaces.

6. The intake module according to claim 5, wherein the two bearing parts have a tear-off edge on a side of the control shaft facing away from the positioning surfaces.

7. The intake module according to claim 1, wherein the two bearing parts are separate modules at least when the at least one bearing bracket is inserted in the at least one bearing receiving portion.

8. The intake module according to claim 1, wherein at least two positioning surfaces are formed in each case at the two bearing parts on each inner surface.

9. The intake module according to claim 8, wherein two of the positioning surfaces are spaced apart from one another in the insertion direction so that the gap is arranged in the insertion direction between the two of the positioning surfaces.

10. The intake module according to claim 1, wherein:
the first bearing part has at least one guide pin protruding in the transverse direction on the inner surface of the first bearing part; and
the second bearing part has on its inner surface at least one guide opening complementary to the at least one guide pin oriented in the transverse direction, into which the at least one guide pin is inserted in the transverse direction.

11. The intake module according to claim 10, wherein:
at least one guide pin is bordered by the positioning surface of the first bearing part; and
at least one guide opening is bordered by the positioning surface of the second bearing part.

12. The intake module according to claim 10, wherein:
the first bearing part has at least two guide pins spaced apart from one another in at least one of the insertion direction and a longitudinal direction; and
the second bearing part has two guide openings complementary to the guide pins and which are spaced apart from one another in at least one of the insertion direction and the longitudinal direction.

13. The intake module according to claim 10, wherein the second bearing part has at least one guide pin inserted in a guide opening formed on the first bearing part.

14. The intake module according to claim 1, one of the first circumferential section or the second circumferential section is greater than 180°.

15. The intake module according to claim 1, wherein a gap is provided in the circumferential direction between the first bearing section and the second bearing section.

16. The intake module according to claim 1, wherein the bearing parts do not contact each other in an area of the bearing sections.

17. The intake module according to claim 1, wherein:
the two bearing sections are not the same size,
one of the bearing parts with a larger bearing section than the other of the bearing parts has a projection which increases the bearing section of the one of the bearing parts in the circumferential direction; and
the other of the bearing parts with a smaller bearing section has a recess which reduces the bearing section of the other of the bearing parts in the circumferential direction, into which the projection engages.

18. The intake module according to claim 17, wherein the two bearing parts do not contact each other in a region of the projection and the recess.

19. The intake module according to claim 1, wherein the positioning surfaces abut against one another in a position plane in which the axis of rotation lies.

20. The intake module according to claim 1, wherein:
the at least one bearing bracket has two outer surfaces on an outer side thereof, which face away from one another in the transverse direction and which each have at least one positioning block projecting therefrom; and
the at least one bearing receiving portion has on its inner side a complementary guide contour for each positioning block for alignment of the bearing bracket in a longitudinal direction parallel to the axis of rotation and in the transverse direction.

21. The intake module according to claim 20, wherein:
each positioning block has two flat longitudinal positioning surfaces facing away from one another in relation to the longitudinal direction which extend parallel to one another and perpendicular to the longitudinal direction; and
for each positioning block, the at least one bearing receiving portion has on its inner side two flat longitudinal guide surfaces facing one another in relation to the longitudinal direction, which extend parallel to one another and perpendicular to the longitudinal direction and against each of which one of the longitudinal positioning surfaces of the positioning block abuts in a flat manner.

22. The intake module according to claim 20, wherein:
each positioning block has a flat transverse positioning surface which extends perpendicular to the transverse direction; and
for each positioning block, the at least one bearing receiving portion on its inner side has a flat transverse guide surface which extends perpendicular to the transverse direction and against which the transverse positioning surface abuts in a flat manner.

23. The intake module according to claim 20, wherein on each outer surface at least one positioning block has a preceding flat stop surface in the insertion direction, which extends perpendicular to the insertion direction and which abuts flat against a flat mating stop surface, which is configured on the complimentary guide contour of the at least one bearing receiving portion.

24. The intake module according to claim 1, wherein at least one of:
  the housing has at least one inlet opening for fresh air and a flange section which has the controllable openings which there form outlet openings for fresh air; and
  the at least one bearing receiving portion is formed on a connection side of the flange section for connection of the housing to the internal combustion engine.

* * * * *